US011993491B2

(12) United States Patent
Guilani

(10) Patent No.: US 11,993,491 B2
(45) Date of Patent: May 28, 2024

(54) TENSION MEMBER FOR ELEVATOR SYSTEM BELT

(71) Applicant: Otis Elevator Company, Farmington, CT (US)

(72) Inventor: Brad Guilani, Woodstock Valley, CT (US)

(73) Assignee: OTIS ELEVATOR COMPANY, Farmington, CT (US)

(*) Notice: Subject to any disclaimer, the term of this patent is extended or adjusted under 35 U.S.C. 154(b) by 385 days.

(21) Appl. No.: 15/958,685

(22) Filed: Apr. 20, 2018

(65) Prior Publication Data

US 2018/0305180 A1 Oct. 25, 2018

Related U.S. Application Data

(60) Provisional application No. 62/487,869, filed on Apr. 20, 2017.

(51) Int. Cl.
*B66B 7/06* (2006.01)
*D07B 1/00* (2006.01)
(Continued)

(52) U.S. Cl.
CPC .............. *B66B 7/062* (2013.01); *D07B 1/005* (2013.01); *D07B 1/165* (2013.01); *F16G 5/06* (2013.01);
(Continued)

(58) Field of Classification Search
CPC .. B66B 7/062; F16G 5/06; F16G 5/14; D07B 2201/2083; D07B 2201/2087
See application file for complete search history.

(56) References Cited

U.S. PATENT DOCUMENTS 8,479,887 B2 7/2013 Yu et al.
8,673,433 B2 3/2014 Reif et al.
(Continued)

FOREIGN PATENT DOCUMENTS

CN 102502164 A 6/2012
CN 204777121 U 11/2015
(Continued)

OTHER PUBLICATIONS

ABOUT__Macmillan_Dictionary.pdf.*
(Continued)

*Primary Examiner* — Minh Truong
(74) *Attorney, Agent, or Firm* — CANTOR COLBURN LLP

(57) ABSTRACT

An elevator belt includes a plurality of tension members arranged along a belt width and extending longitudinally along a length of the belt. Each tension member includes a core member formed from a composite material, and a plurality of second fibers to enhance temperature resistance of the tension member. A jacket material encapsulates the tension members. An elevator system includes a hoistway, an elevator car located in the hoistway and movable therein and a belt operably connected to the elevator car to suspend and/or drive the elevator car along the hoistway. The belt includes a plurality of tension members arranged along a belt width and extending longitudinally along a length of the belt. Each tension member includes a core member formed from a composite material, and plurality of second fibers to enhance temperature resistance of the tension member. A jacket material at least partially encapsulates the tension members.

10 Claims, 3 Drawing Sheets

(51) Int. Cl.
*D07B 1/16* (2006.01)
*F16G 5/06* (2006.01)
*F16G 5/14* (2006.01)

(52) U.S. Cl.
CPC ........ *F16G 5/14* (2013.01); *D07B 2201/2083* (2013.01); *D07B 2401/2035* (2013.01); *D07B 2501/2007* (2013.01)

(56) References Cited

U.S. PATENT DOCUMENTS

| | | | | |
|---|---|---|---|---|
| 9,051,651 | B2* | 6/2015 | Veronesi | D07B 1/0666 |
| 2011/0259677 | A1* | 10/2011 | Dudde | D07B 1/145 187/411 |
| 2012/0329591 | A1 | 12/2012 | Goeser et al. | |
| 2013/0171463 | A1* | 7/2013 | Chang | B66B 7/06 428/549 |
| 2014/0243134 | A1* | 8/2014 | Kucharczyk | C08J 5/24 474/261 |
| 2015/0191331 | A1 | 7/2015 | Orelup et al. | |
| 2015/0259176 | A1 | 9/2015 | Goeser et al. | |
| 2016/0060077 | A1* | 3/2016 | Haapaniemi | B66B 11/08 187/255 |
| 2016/0325966 | A1 | 11/2016 | Papas et al. | |
| 2017/0043979 | A1* | 2/2017 | Kucharczyk | B66B 7/062 |
| 2018/0186604 | A1* | 7/2018 | Helenius | D07B 5/006 |
| 2020/0122971 | A1* | 4/2020 | Hida | D07B 1/22 |

FOREIGN PATENT DOCUMENTS

| | | | |
|---|---|---|---|
| CN | 105347140 | A | 2/2016 |
| CN | 105672009 | A | 6/2016 |
| CN | 205636323 | U | 10/2016 |
| CN | 106192494 | A | 12/2016 |
| DE | 102014208223 | A1 | 11/2015 |
| EP | 3330209 | A1 | 6/2018 |
| JP | 3071194 | B1 | 7/2000 |
| JP | 2002231070 | A | 8/2002 |
| JP | 2003201688 | A | 7/2003 |
| JP | 2015074871 | A | 4/2015 |
| WO | 2010072690 | A1 | 7/2010 |
| WO | 2013055328 | A1 | 4/2013 |
| WO | 2016030298 | A1 | 3/2016 |

OTHER PUBLICATIONS

European Search Report Issue In EP Application No. 18168005.9, dated Sep. 4, 2018, 9 Pages.
1 Chinese Office Action for Chinese Application No. 201810354110.6; dated Sep. 23, 2020, 15 pages.
Office Action for Japanese Application No. 2018-81038 dated Apr. 5, 2022.

* cited by examiner

TENSION MEMBER FOR ELEVATOR SYSTEM BELT

CROSS-REFERENCE TO RELATED APPLICATIONS

This application claims the benefit of 62/487,869, filed Apr. 20, 2017, which is incorporated herein by reference in its entirety.

BACKGROUND

Embodiments disclosed herein relate to elevator systems, and more particularly to load bearing members to suspend and/or drive elevator cars of an elevator system.

Elevator systems are useful for carrying passengers, cargo, or both, between various levels in a building. Some elevators are traction based and utilize load bearing members such as belts for supporting the elevator car and achieving the desired movement and positioning of the elevator car.

Where a belt is used as a load bearing member, a plurality of tension members, or cords, are embedded in a common jacket. The jacket retains the cords in desired positions and provide a frictional load path. In an exemplary traction elevator system, a machine drives a traction sheave with which the belts interact to drive the elevator car along a hoistway. Belts typically utilize tension members formed from steel elements, but alternatively may utilize tension members formed from synthetic fibers or other materials, such as carbon fiber composites.

In a carbon fiber composite tension member, the members have good strength to weight characteristics, but typically have reduced high temperature performance compared to tension members formed from steel wires.

BRIEF DESCRIPTION

In one embodiment, a belt for an elevator system includes a plurality of tension members arranged along a belt width and extending longitudinally along a length of the belt. Each tension member includes a core member formed from a composite material, and a plurality of second fibers to enhance temperature resistance of the tension member. A jacket material at least partially encapsulates the plurality of tension members.

Additionally or alternatively, in this or other embodiments the core member includes a plurality of first fibers disposed in a matrix material.

Additionally or alternatively, in this or other embodiments the first fibers are one or more of carbon, glass, aramid, nylon, and polymer fibers.

Additionally or alternatively, in this or other embodiments the matrix material is a polyurethane, vinyl ester, polybenzoxazine, or epoxy material.

Additionally or alternatively, in this or other embodiments the plurality of second fibers are located between the core member and the jacket material.

Additionally or alternatively, in this or other embodiments a volume ratio of second fibers to first members in the core member is between 10% and 25%.

Additionally or alternatively, in this or other embodiments the plurality of second fibers surround the core member.

Additionally or alternatively, in this or other embodiments the plurality of second fibers are dispersed with the first fibers in the core member.

Additionally or alternatively, in this or other embodiments a volume ratio of second fibers to first fibers is between 40% and 60%.

In another embodiment, an elevator system includes a hoistway, an elevator car located in the hoistway and movable therein and a belt operably connected to the elevator car to suspend and/or drive the elevator car along the hoistway. The belt includes a plurality of tension members arranged along a belt width and extending longitudinally along a length of the belt. Each tension member includes a core member formed from a composite material, and plurality of second fibers to enhance temperature resistance of the tension member. A jacket material at least partially encapsulates the plurality of tension members.

Additionally or alternatively, in this or other embodiments the core member includes a plurality of first fibers located in a matrix material.

Additionally or alternatively, in this or other embodiments the first fibers are one or more of carbon, glass, aramid, nylon, and polymer fibers.

Additionally or alternatively, in this or other embodiments the matrix material is a polyurethane, vinyl ester, polybenzoxazine, or epoxy material.

Additionally or alternatively, in this or other embodiments the plurality of second fibers are located between the core member and the jacket material.

Additionally or alternatively, in this or other embodiments a volume ratio of second fibers to first members in the core member is between 10% and 25%.

Additionally or alternatively, in this or other embodiments the plurality of second fibers surround the core member.

Additionally or alternatively, in this or other embodiments the plurality of second fibers are dispersed with the first fibers in the core member.

Additionally or alternatively, in this or other embodiments a volume ratio of second fibers to first fibers is between 40% and 60%.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
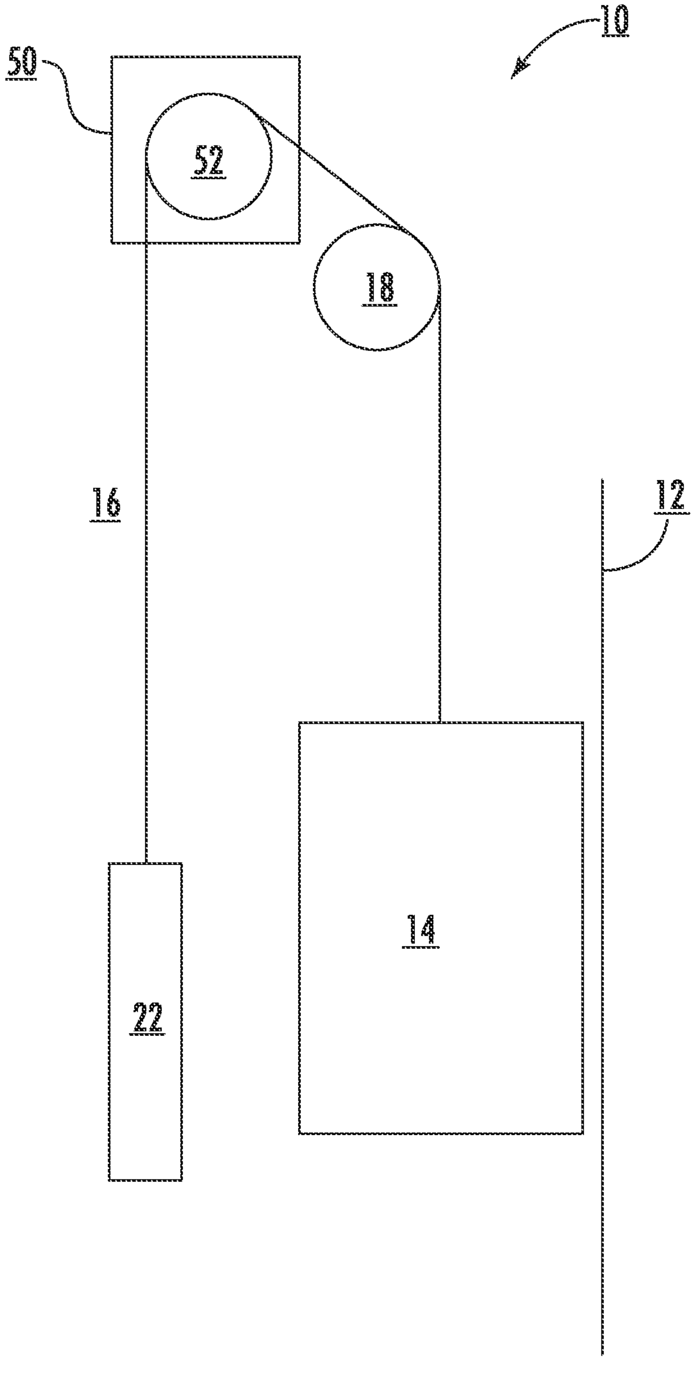
FIG. 1 is a schematic illustration of an embodiment of an elevator system.

Shown in FIG. 1, is a schematic view of an exemplary traction elevator system 10. Features of the elevator system 10 that are not required for an understanding of the present invention (such as the guide rails, safeties, etc.) are not discussed herein. The elevator system 10 includes an elevator car 12 operatively suspended or supported in a hoistway 14 with one or more belts 16. The one or more belts 16 interact with one or more sheaves 18 to be routed around various components of the elevator system 10. The one or more belts 16 could also be connected to a counterweight 22, which is used to help balance the elevator system 10 and reduce the difference in belt tension on both sides of the traction sheave during operation.

The sheaves 18 each have a diameter, which may be the same or different than the diameters of the other sheaves 18 in the elevator system 10. At least one of the sheaves could be a traction sheave 52. The traction sheave 52 is driven by a machine 50. Movement of drive sheave by the machine 50 drives, moves and/or propels (through traction) the one or more belts 16 that are routed around the traction sheave 52. At least one of the sheaves 18 could be a diverter, deflector or idler sheave. Diverter, deflector or idler sheaves are not driven by a machine 50, but help guide the one or more belts 16 around the various components of the elevator system 10.

In some embodiments, the elevator system 10 could use two or more belts 16 for suspending and/or driving the elevator car 12. In addition, the elevator system 10 could have various configurations such that either both sides of the one or more belts 16 engage the one or more sheaves 18 or only one side of the one or more belts 16 engages the one or more sheaves 18. The embodiment of FIG. 1 shows a 1:1 roping arrangement in which the one or more belts 16 terminate at the car 12 and counterweight 22, while other embodiments may utilize other roping arrangements.

The belts 16 are constructed to have sufficient flexibility when passing over the one or more sheaves 18 to provide low bending stresses, meet belt life requirements and have smooth operation, while being sufficiently strong to be capable of meeting strength requirements for suspending and/or driving the elevator car 12.

Figure 2:
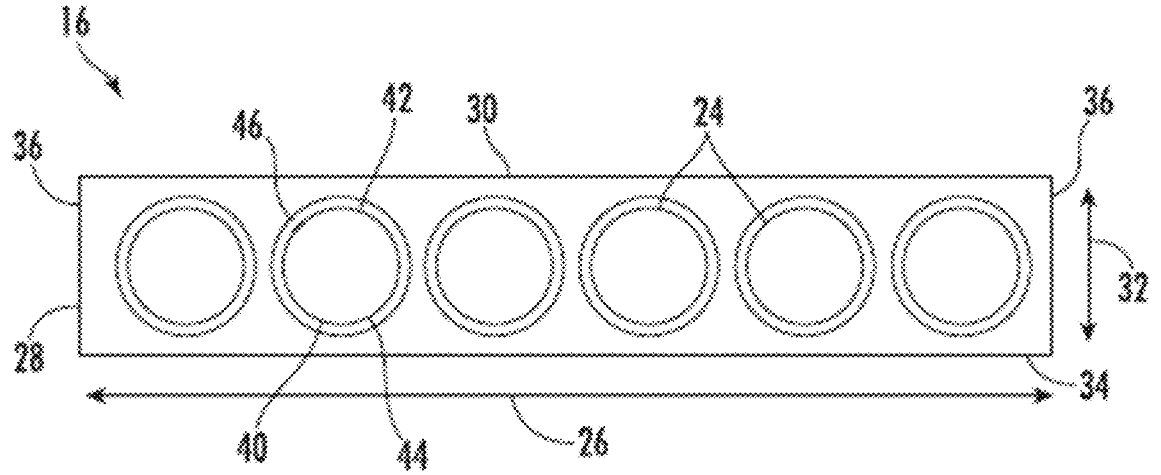
FIG. 2 is a schematic cross-sectional view of an embodiment of an elevator system belt.

FIG. 2 provides a cross-sectional schematic of an exemplary belt 16 construction or design. The belt 16 includes a plurality of tension members 24 extending longitudinally along the belt 16 and arranged across a belt width 26. The tension members 24 are at least partially enclosed in a jacket material 28 to restrain movement of the tension members 24 in the belt 16 and to protect the tension members 24. The jacket material 28 defines a traction side 30 configured to interact with a corresponding surface of the traction sheave 52. Exemplary materials for the jacket material 28 include the elastomers of thermoplastic and thermosetting polyurethanes, polyamide, thermoplastic polyester elastomers, and rubber, for example. Other materials may be used to form the jacket material 28 if they are adequate to meet the required functions of the belt 16. For example, a primary function of the jacket material 28 is to provide a sufficient coefficient of friction between the belt 16 and the traction sheave 52 to produce a desired amount of traction therebetween. The jacket material 28 should also transmit the traction loads to the tension members 24. In addition, the jacket material 28 should be wear resistant and protect the tension members 24 from impact damage, exposure to environmental factors, such as chemicals, for example.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While six tension members 24 are illustrated in the embodiment of FIG. 2, other embodiments may include other numbers of tension members 24, for example, 4, 8, 10 or 12 tension members 24. Further, while the tension members 24 of the embodiment of FIG. 2 are substantially identical, in other embodiments, the tension members 24 may differ from one another.

As shown in FIG. 2, the tension members 24 each include a composite core member 40 formed from synthetic fibers or from a composite construction, such as a plurality of first fibers 42 disposed in a matrix material 44.

Exemplary first fibers 42 include, but are not limited to, carbon, glass, aramid, nylon, and polymer fibers, for example. Each of the first fibers 42 may be substantially identical or may vary. In addition, the matrix material 44 may be formed from any suitable material, such as polyurethane, vinyl ester, polybenzoxazine, and epoxy for example. The materials of the first fibers 42 and the matrix material 44 are selected to achieve a desired stiffness and strength of the tension member 24.

Figure 3:
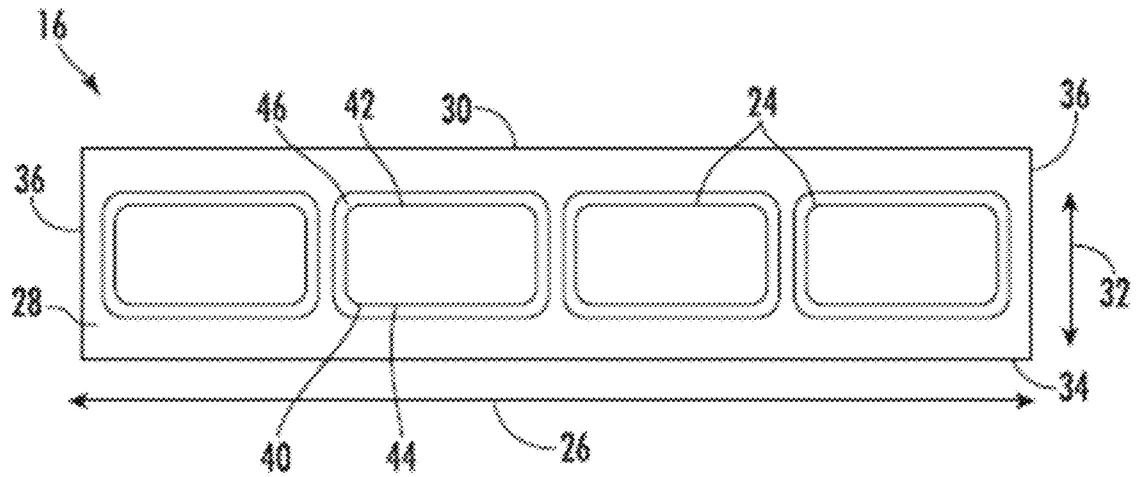
FIG. 3 is another cross-sectional view of an embodiment of an elevator system belt.

The core member 40 may be formed as thin layers, in some embodiments by a pultrusion process. In a standard pultrusion process, the first fibers 42 are impregnated with the matrix material 44 and are pulled through a heated die and additional curing heaters where the matrix material 44 undergoes cross linking. A person having ordinary skill in the art will understand that controlled movement and support of the pulled first fibers 42 may be used to form a desired linear or curved profile of the core member 40. In an exemplary embodiment, the core member 40 has a cross-sectional thickness of about 0.5 millimeters to about 4 millimeters. In another embodiment, the core member 40 has a cross-sectional thickness of 1 millimeter. Further, in some embodiments such as shown in FIG. 2, the core member 40 has a circular cross-section, while in other embodiments the core member 40 may have other cross-sectional shapes, such as rectangular as shown in FIG. 3, oval or elliptical.

The tension member 24 further includes a cover 46 disposed at an outer perimeter of the core member 40. The cover 46 encloses the core 40 and extends in a generally lengthwise direction along the tension member 24. The cover 46 is formed from second fibers, for example, basalt fibers, to improve high temperature resistance of the tension member 24. The cover 46 may be formed and applied to the core 40 by, for example, co-extrusion or co-pultrusion with the core 40 with the cover 46 material arranged at the outer perimeter, basalt fibers may be wrapped around a completed core 40 after the pultrusion process, or the core 40 may be inserted into a woven cover 46 of basalt fibers. In some embodiments, a volume fraction of basalt fibers in the cover 46 to first fibers 42 in the core 40 is at least 1%. In other embodiments, the volume fraction is between 10% and 25%.

Figure 4:
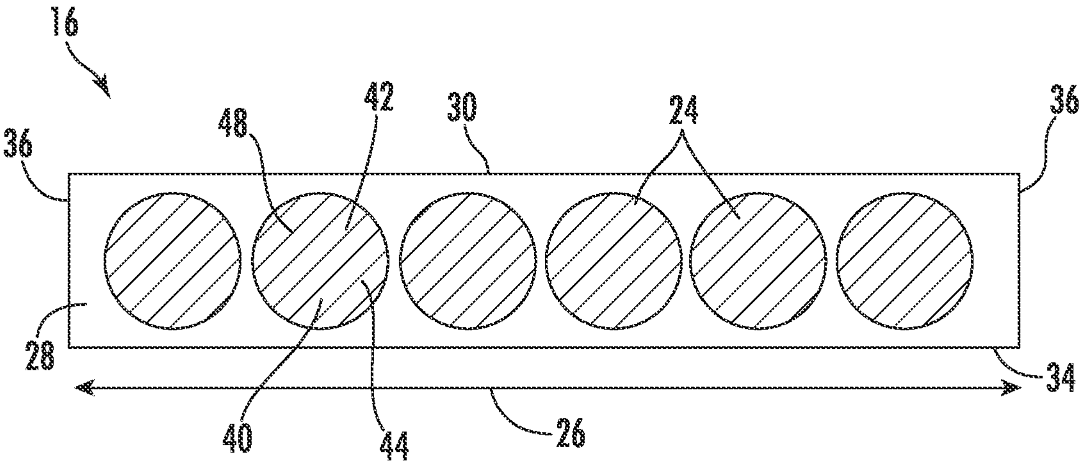
FIG. 4 is yet another cross-sectional view of an embodiment of an elevator system belt.

In another embodiment, shown in FIG. 4, second fibers 48, in some embodiments formed from basalt, are dispersed with the first fibers 42 in the core 40 and co-formed with the core 40 to form the tension member 24. A volume ratio of second fibers 48 to first fibers 42 is at least 1%, while in some embodiments the volume ratio is between 40% and 60%. Dispersing the second fibers 48 within the core 40 with the first fibers 42 improves the high-temperature resistance of the tension member 24. Further, in some embodiments, a cover 46 of basalt fibers may also be included to further improve the high-temperature resistance of the tension member 24. In such embodiments, the volume ratio of second fibers 48 to first fibers 42 may exceed 60%, and may in some embodiments exceed 75% or more.

Second fibers 48 have superior temperature performance compared to carbon, glass, aramid and other first fibers 42 due at least in part to the relatively high crystallinity of the second fibers 48. Further, tensile strength of second fibers 48 is comparable to the tensile strength of carbon fiber first fibers 42, although the stiffness of second fibers 48 is lower than that of carbon fiber first fibers 42.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt for an elevator system, comprising:
- a plurality of tension members arranged along a belt width and extending longitudinally along a length of the belt, each tension member including:
  - a core member formed from a composite material, the core member including a plurality of first fibers disposed in a matrix material; and
  - a plurality of second fibers wrapped around the core member defining a cover surrounding the core member to enhance temperature resistance of the tension member; and
  - a jacket material defining a jacket at least partially encapsulating the plurality of tension members;
- wherein the cover is applied directly to an outer perimeter of the core member between the core member and the jacket, the cover distinct from the jacket;
- and
- wherein the core member has a cross-sectional thickness in the range of 0.5 millimeters to 4 millimeters;
- wherein the plurality of second fibers are a plurality of basalt fibers.

2. The belt of claim 1, wherein the plurality of first fibers are one or more of carbon, glass, aramid, nylon and polymer fibers.

3. The belt of claim 1, wherein the matrix material is a polyurethane, vinyl ester, polybenzoxazine, or epoxy material.

4. The belt of claim 1, wherein a volume ratio of second fibers to first members in the core member is between 10% and 25%.

5. The belt of claim 1, wherein the plurality of second fibers surround the core member.

6. An elevator system, comprising:
- a hoistway;
- an elevator car disposed in the hoistway and movable therein;
- a belt operably connected to the elevator car to suspend and/or drive the elevator car along the hoistway, the belt including:
  - a plurality of tension members arranged along a belt width and extending longitudinally along a length of the belt, each tension member including:
    - a core member formed from a composite material, the core member including a plurality of first fibers disposed in a matrix material; and
    - a plurality of second fibers wrapped around the core member defining a cover surrounding the core member to enhance temperature resistance of the tension member;
  - and
  - a jacket material defining a jacket at least partially encapsulating the plurality of tension members;
    - wherein the cover is applied directly to an outer perimeter of the core member between the core member and the jacket, the cover distinct from the jacket; and
    - wherein the core member has a cross-sectional thickness in the range of 0.5 millimeters to 4 millimeters;
    - wherein the plurality of second fibers are a plurality of basalt fibers.

7. The elevator system of claim 6, wherein the plurality of first fibers are one or more of carbon, glass, aramid, nylon and polymer fibers.

8. The elevator system of claim 6, wherein the matrix material is a polyurethane, vinyl ester, polybenzoxazine, or epoxy material.

9. The elevator system of claim 6, wherein a volume ratio of second fibers to first members in the core member is between 10% and 25%.

10. The elevator system of claim 6, wherein the plurality of second fibers surround the core member.

* * * * *